(12) United States Patent
Morse (10) Patent No.: US 6,918,350 B1
(45) Date of Patent: Jul. 19, 2005

(54) SEA-BASED HYDROGEN-OXYGEN GENERATION SYSTEM

(75) Inventor: Arthur Morse, 215 Musket Cir., Lansdale, PA (US) 19446

(73) Assignees: Arthur Morse, Lansdale, PA (US); Michael L. Russo, Wilmington, MA (US)

( * ) Notice: Subject to any disclaimer, the term of this patent is extended or adjusted under 35 U.S.C. 154(b) by 0 days.

(21) Appl. No.: 10/709,744

(22) Filed: May 26, 2004

(51) Int. Cl.$^7$ ................................................ B63B 17/00
(52) U.S. Cl. ...................................................... 114/382
(58) Field of Search ........................................ 114/382

(56) References Cited

U.S. PATENT DOCUMENTS

| | | | |
|---|---|---|---|
| 3,484,617 A | * | 12/1969 | August ........................ 290/44 |
| 3,754,147 A | * | 8/1973 | Hancock et al. .............. 290/53 |
| 4,653,982 A | | 3/1987 | Kojima et al. ................ 416/44 |
| 5,503,525 A | | 4/1996 | Brown et al. ................. 416/24 |
| 6,294,844 B1 | * | 9/2001 | Lagerwey ..................... 290/50 |

* cited by examiner

*Primary Examiner*—Jesus D. Sotelo
(74) *Attorney, Agent, or Firm*—Mark P. White (57) ABSTRACT

A method for generation of hydrogen and oxygen contained in a salt solution provides for the disposing a number of wind turbines on navigable collection vessels in waters distant from shore. The wind turbines have a large number of blades, typically 30, to provide high torque for generating electricity used for extracting said gasses from the atmosphere by means of electrolysis. The collection vessels are disposed in predetermined zones, which are changed when weather conditions provide better collection conditions elsewhere. The gasses are stored in cylinders located both on the collection vessels, and on storage vessels attached to the collection vessels. After collection the cylinders are transported to shore facilities for further purification and/or distribution.

11 Claims, 10 Drawing Sheets

SEA-BASED HYDROGEN-OXYGEN GENERATION SYSTEM

BACKGROUND OF INVENTION

The present invention is a system and method for using wind power for the generation of hydrogen and oxygen. In its simplest form the wind is used to rotate a wind turbine, which is attached to an electric generator. The electricity produced by the generator is then used to power an electrolysis subsystem, which produces hydrogen and oxygen from the water in the electrolysis salt bath.

The novelty in the present system arises from the fact that the wind turbines are located on collection vessels at sea, configured for this purpose. The vessels can be disposed out of the sight of land, which avoids the political problems attendant to the location of wind farms in proximity to residential areas. Furthermore, the collection vessels may be moved to the areas having the optimal wind and sea conditions for the generation of these gasses.

In a sense, the present system is a method of extracting and storing energy from the wind for future use. It has been noted, for example, that the use of hydrogen as a fuel for automobiles requires that energy be expended to produce the hydrogen before it is released to propel an automobile. Storing the energy in the form of compressed gasses is an alternative to the traditional storage methods, such as electric batteries.

The present invention utilizes variable speed, high torque wind turbines that maximize power output per capital dollar expended on the system. Further, the land costs of traditional wind farms are eliminated, together with the location limitations and political issues associated with wind turbine sites. This invention includes a storage, transfer and distribution system that utilizes state-of-the art communication and control sub-systems, thereby minimizing operational labor costs.

The sea west or east of the continental United States, contains the best wind quality for wind turbine applications, and is far superior to most of the land sites available. Due to the curvature of the earth, sites located 20 to 25 miles from land are not visible and, therefore, political opposition to the use of such sites is greatly reduced.

There are many ocean sites currently employing wind turbine technology to generate electricity. Denmark, for instance, has very aggressive plans to convert most of its energy generation to wind-based systems within the next ten years. In the United States, locations in Nantucket Sound, off Cape Cod, Mass., are being considered as sites for wind farms.

These sites, however, are connected directly to local power grids, as opposed to the storage of power in the forms of the present invention. Furthermore, most of these pior-art systems are on the land or close to land and are, therefore, impacted by land effect conditions which make energy generation much more costly than generation at sea. The sea-based prior art systems are generally anchored directly onto the ocean bottom and, therefore, must be located in areas of shallow ocean depths.

To overcome these restrictions, the present method provides for wind generation systems at sea which are free floating. Thus, with the present approach there are far fewer site limitations, no land costs, and limited potential political opposition.

The following description discloses and claims a system to cost effectively generate hydrogen and oxygen gas by using wind as an alternative energy source. The application further describes how the floating sites at sea are configured and managed to provide the most cost effective method for this technology.

SUMMARY OF INVENTION

It is the object of this invention to provide a method for the generation and storage of oxygen and hydrogen from the power of the wind.

It is further object of this invention to minimize the objections of such a generation system arising from political and environmental concerns.

In accordance with a first aspect of the invention the method includes the disposing one or more floating wind turbines on waters distant from a proximate shore.

In accordance with a second aspect of the invention each of the wind turbines generate electricity by means of an electrical generator connected thereto.

In accordance with a third aspect of the invention gasses are extracted from purified water to which a salt solution has been added by means of electrolysis using the electricity so generated.

In accordance with a fifth aspect of the invention each of the wind turbines is affixed to a navigable collection vessel.

In accordance with a sixth aspect of the invention each of the vessels is disposed within a predetermined geographic zone.

In accordance with a seventh aspect of the invention each of the zones provides a suitable wind velocity for operation of the wind turbines.

In accordance with an eighth aspect of the invention each of the zones is chosen so as not to interfere with established shipping lanes.

In accordance with a ninth aspect of the invention communication is provided between the collection vessels within the zone and a central command center.

In accordance with a tenth aspect of the invention each wind turbine has a multiplicity of blades, each of which has a controllable angle of attack.

In accordance with an eleventh aspect of the invention the angle of attack of each turbine blade is adjusted in order to optimize power output.

In accordance with a twelfth aspect of the invention the vessels are controlled by remote control.

In accordance with a thirteenth aspect of the invention the turbine blades are retracted during collection vessel travel.

In accordance with a fourteenth aspect of the invention the turbine blades are retracted in areas of high wind so that the wind turbines are not damaged thereby.

In accordance with a fifteenth aspect of the invention one or more storage vessels are located within each predetermined zone for periodic transport of the gasses produced by the collection vessels.

In accordance with a sixteenth aspect of the invention a sea based central transfer station is provided for collecting the gasses from the collection vessels and the storage vessels.

In accordance with a seventeenth aspect of the invention the gasses are transferred by pipeline from the sea based central transfer station into a shore storage and purification facility.

In accordance with an eighteenth aspect of the invention means are provided for the remote-controlled docking of any two or more of the vessels at sea for transferring said gasses between said vessels.

In accordance with a nineteenth aspect of the invention each of the collection vessels has a sea anchor, which may be disposed in the water in order to reduce the drift of the vessel and to maintain the vessel with its bow facing into the wind.

In accordance with a twentieth aspect of the invention a multiplicity of cables are provided for maintaining each sea anchor in an anchoring position.

In accordance with a twenty-first aspect of the invention one or more retraction cables are included for retracting each sea anchor.

In accordance with a twenty-second aspect of the invention each sea anchor may be retracted into a storage tube affixed to the corresponding collection vessel.

In accordance with a twenty-third aspect of the invention each sea anchor may be released from its storage tube into disposed mode in the waters in front of the vessel.

In accordance with a twenty-fourth aspect of the invention means are provided for maximizing the torque from each electrical generator for each value of current wind speed and generator load.

In accordance with a twenty-fifth aspect of the invention, the means for maximizing torque include increasing the number of blades in the turbine to an optimum number.

In accordance with a twenty-sixth aspect of the invention the means for maximizing torque further include increasing the area of each such blade to an optimum area.

In accordance with a twenty-seventh aspect of the invention the means for maximizing torque further include autonomously controlling each turbine blade angle to the optimum blade angle.

In accordance with a final aspect of the invention the gasses produced include oxygen and hydrogen.

BRIEF DESCRIPTION OF DRAWINGS

These, and further features of the invention, may be better understood with reference to the accompanying specification and drawings depicting the preferred embodiment, in which.

DETAILED DESCRIPTION

The present system utilizes $19^{th}$ century technology, using a turbine with many blades on a single turbine rotor. In this way it maximizes the amount of blade surface area exposed to the wind to create increased torque, which, in turn, increases the output of the generator used for electrolysis. Any combination of voltage and current will cause the electrolysis process to work. Therefore, the main area of concern is to create as much torque as possible to drive the system. The revolutions per minute of the rotor are automatically controlled by the present invention in order to maximize power output under both normal and low wind conditions, and to minimize the stresses on the system in high wind conditions.

The system has three key operational modes:

1. Power Conversion:

In this mode the turbines are generating power from the wind, and the electricity resulting is used to create hydrogen and oxygen by electrolysis of water.

The system utilizes an oversized Sea Anchor to provide resistance against the wind when the system is collecting and converting wind energy into hydrogen and oxygen. Sea Anchors are not directly connected to the ocean bottom. Rather, they are a hydraulic version of a parachute that resists drift instead of stopping it. Sea Anchors are well known in the prior art, and are standard for use in lifeboats, since they keep the lifeboat pointed into the wind and greatly slow drifting.

Wind turbine collection vessels utilizing sea anchors during operation would slowly drift in the direction of the wind. The rate of drift depends upon the wind speed and the amount of wind spillage by the turbine blades, since the turbine will spill air by feathering its blades in high wind conditions. Further, eddy current losses associated with the sea anchor further affect drift.

The gasses collected are temporarily stored in the "bottles" commonly used for storage of hydrogen and oxygen.

In addition to containers on the collection vessel, a second storage vessel in tow to the collection vessels provides temporary additional storage for the gasses.

2. Navigation:

The present invention utilizes a predetermined zone of operation for the collection vessels. Despite attempts to keep the collection vessels from drifting, they eventually do move away from their desired collection location, where the wind is optimum for the generation of the gasses. Repositioning of the collection vessels back to desired locations and transfer points for the collected gasses is needed.

Each collection vessel is free floating. An onboard navigation and communication system is required for each collection vessel in order to provide continual feedback to a shore based control center that monitors location and controls navigation of the collection vessel. Global positioning and radar communication is utilized for this purpose.

On-board propulsion and steering capability for each collection vessel is essential. In the present invention a propulsion drive system utilizing an internal combustion drive system fueled by the hydrogen and oxygen collected by the collection vessel is used.

Thus, the only fuel cost associated with repositioning is the diminution of the gasses produced during collection. However, the frequency and time to reposition is managed to minimize the amount of the gasses needed to fuel the propulsion of the vessels when repositioning them throughout the year.

Increasing the speed of repositioning by retracting the sea anchor and turbine blades, and increasing the horsepower of the main propulsion system thereby, will minimize the costs of repositioning.

3. Product Transfer:

The gasses produced by the collection operation must be transported to one or more distribution points, for transport to end-users. This normally requires transport of the containers of gasses collected to distribution points on the land. Transfer operations will utilize both modern communication technologies and robotics.

A docking, connecting a collection vessel to a secondary fuel storage vessel, would be controlled through GPS, remote controls using vision feedback systems and onboard PLC (Programmable Logic Controller) controls. Docking is also provided between the collection vessels and other stationary locations at sea.

The storage vessel, filled with gasses after transfer, would then detach from the collection vessel and then remotely navigate to a stationary fuel transfer facility at sea. This facility should be located near shore, so that the gasses can be pipelined to an onshore storage facility. Meanwhile another, empty secondary storage vessel will quickly replace the previous one, and rendezvous and dock with the collection vessel, thereby minimizing the downtime in the collection process.

Each storage vessel has an onboard propulsion system that will use Hydrogen as a fuel to transport the vessel to a central off-loading station near the shoreline. The vessel's progress is monitored by GPS positioning. Onboard cameras and radar provide information used by the automatic navigation system.

Once gasses are transferred from the storage vessel to the product transfer facility, the now-empty secondary storage vessel would return to stand by near the collection vessel sailing areas until needed to replace another storage vessel.

Figure 1:
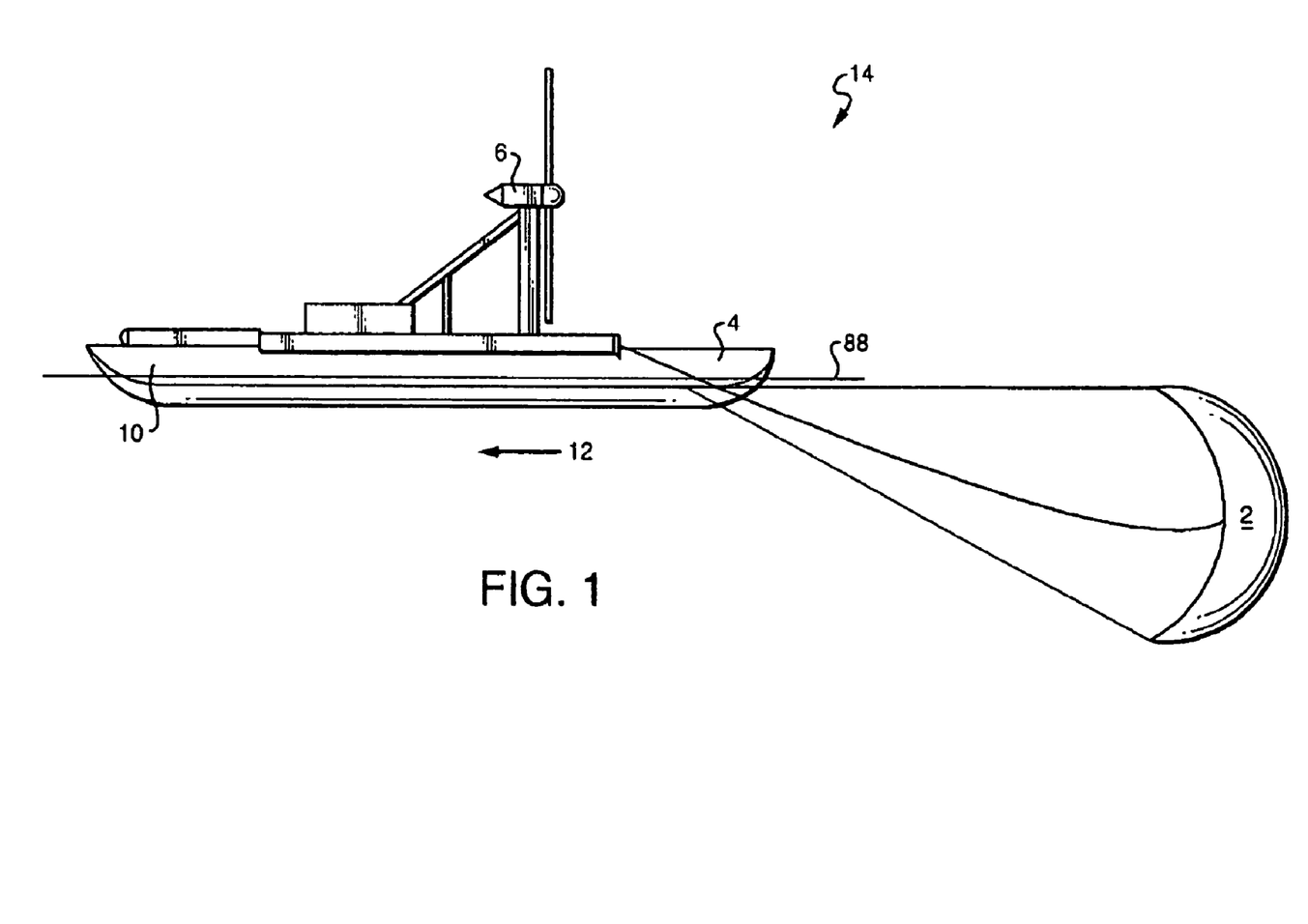
FIG. 1 depicts a collection vessel in collection mode, with sea anchor set.

Referring first to FIG. 1, the vessel illustrated, at sea (reference number 88 is the waterline), possesses the features discussed; the vessel also contains a propulsion system that is located near the bow 4. The propulsion system may be a standard internal combustion engine or modified gas/steam turbine. However, instead of gasoline or diesel power, hydrogen and oxygen fuel the engine.

Because the wind vessel faces the wind 14, it travels backward 12 while not under sail or power. The vessel is a "double-ender", with bow 4 and stern 10 having identical shapes. The bow faces wave activity during production operations and the stern experiences waves while the vessel is underway.

FIG. 1 shows a sea anchor 2 disposed in front of the bow. The sea anchor is in the shape of a "parachute", and has the same function: it slows the speed of the vessel by creating a drag when the vessel moves in the direction of the wind 14, which is also the direction of drift 12 of the vessel.

Figure 3:
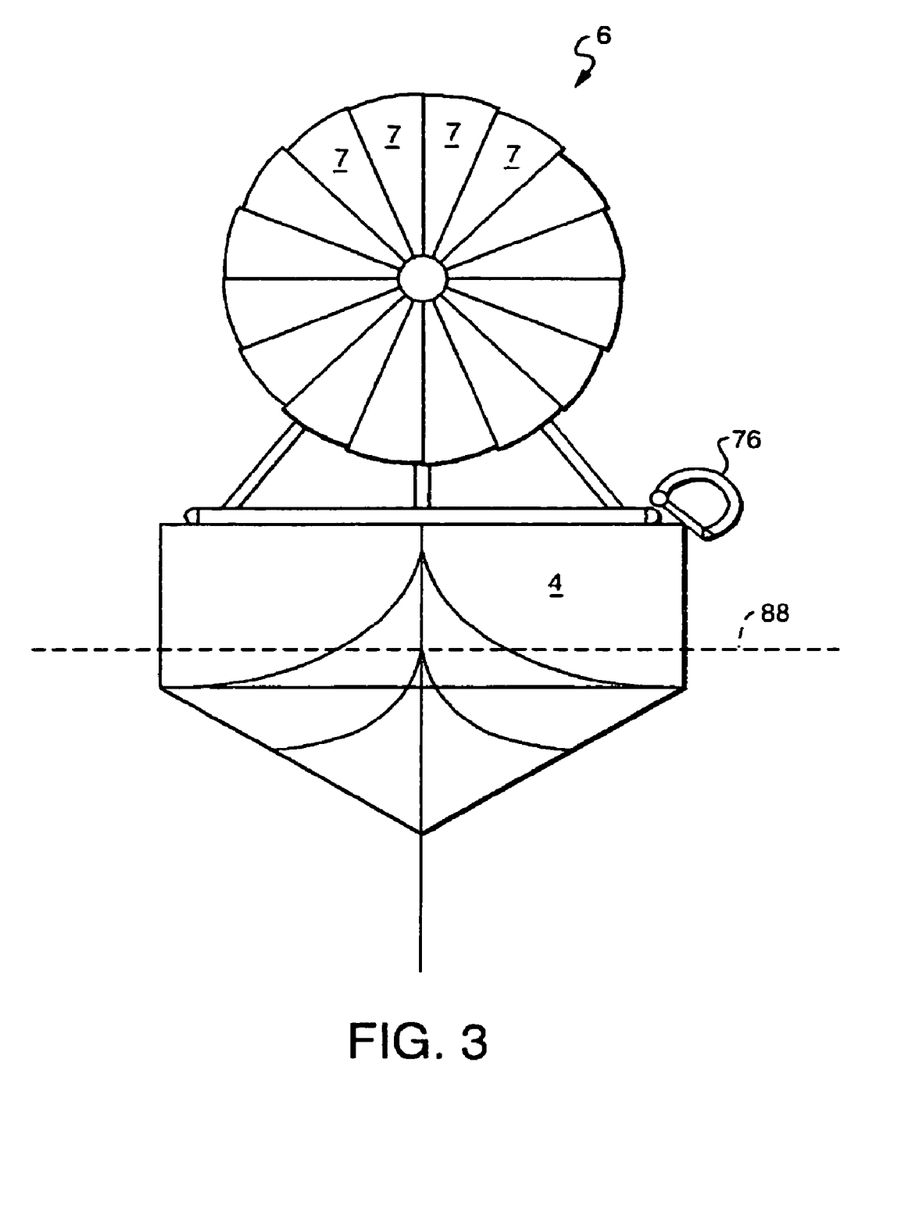
FIG. 3 depicts an end elevation view of the collection vessel.

A monohull design as displayed in FIG. 3 is expected to be the most stable platform for this kind of application. However, other types of hulls would work. For example, obsolete naval vessels are often auctioned off by the US government and could be converted to support wind systems.

Controlling Turbine Speeds vs. Power Output:

The current output is dependent upon the available voltage supplied by the generator and the resistance to current flow within the entire electrical circuit. As resistance is reduced more current can flow with any given voltage. Both the generator output (current and voltage) will be monitored by PLC controls and an onboard computer. Turbine speed will be adjusted to maximize current and voltage. The greater the power passing through the system, commonly known as system load, the greater the torque that is applied to the wind turbine main drive shaft by the generator dragging against the wind turbine. The turbine blade will convert wind energy to mechanical shaft power, which speeds up shaft rotation. The generator converts the shaft rotation into electrical power causing an opposing back mechanical torque on the same shaft.

As wind speed increases, mechanical shaft speed increases. Back torque is then applied to the shaft by the generator that is under load. The generator load will increase by reducing line resistance at the hydrogen generator (discussed below) and therefore increasing back mechanical torque on the shaft. A balance of maximizing wind/mechanical energy conversion (creating positive mechanical shaft torque) and back mechanical shaft torque is important to prevent possible run away speeds of the wind turbine. The turbine design will be limited to a maximum rotational speed to minimize the possibility of damage in high winds due to the forces involved with over speeding.

In the modern, hi-tech wind turbines an on-board computer will record both the real and apparent wind speed and angle, so that the blades of the turbine can be adjusted to an angle for optimum power. The use of variable pitch blades is well known and understood in the prior art. It is used not only for wind turbines, but also in marine propulsion screws, in airplanes, and in helicopters. The principle in regard to wind turbines is discussed in detail in U.S. Pat. No. 5,503,525, Pitch-regulated vertical access wind turbine, Brown, et al.

The apparent wind, in this case the wind relative to the turbine blades, is measured by means of transducers. The speed of the blades is also measured by different transducers. This technology is well known, and the wind speed and angle calculations are routinely performed in modern yachts, while the measurement of the shaft speed of the rotor is done by prior-art methods universally known and understood.

The turbine contains a number of blades which have adjustable angles of attack, defined as the angle between the front edge of the turbine blade and the direction of the wind flowing across the front edge. The angle of attack is adjusted to obtain maximum efficiency given the speed and direction of the apparent wind.

An added complexity is that the apparent wind is faster at the ends of the blades than in the center, since the blades are travelling faster at the edges than at the center. To compensate for this difference the turbine blades of the present invention have an angle relative to the plane of rotation, which continuously decreases along the length of the blade to some minimum angle at the end of the blades.

Multi-Blade Wind Turbine Designs

To build upon the discussion above, the absolute available wind energy in a given space can never be completely absorbed by a wind machine. A German Physicist Albert Betz developed Betz's Law in 1919 described in his book "Wind-Energy" published in 1926. According to Betz's Law, the maximum energy that can be absorbed from a wind turbine is about 59% of the available energy (if 100% of the available energy was removed, the wind turbine would not turn because there would be no air flow through the turbine blades). At the same time, energy absorption is directly proportional to the amount of blade surface area driving an electrical generator. For a given area, the greater the blade area exposed to the wind, the greater the torque on the generator.

Common industrial wind turbines have 3 blades and do not take advantage of this basic concept. As a result, within the diameter of the turbine rotor, modern day wind turbines only absorb a fraction of the available wind going through that same space. The present 3-bladed approach has been almost universally adopted in prior art wind farms because almost all of their wind turbines are connected directly to the power grid. This requires strict quality standards for voltage and frequency of the generated electricity. Turbine speed, and therefore generator speed has to be maintained at a constant rate to meet these standards. Any fluctuation due to changing wind speeds is compensated for by feathering the turbine blades to spill air, thereby reducing the surface area exposed to the wind, and minimizing the variations caused by gusts. Also, the turbine blades themselves have to travel at relatively high rates of speed in order to meet frequency standards, that exacerbates the effect of the wakes of one turbine blade on a nearby blade residing on the same rotor.

In a typical standard 3-blade turbine design having a diameter of 20 feet has a blade area of about 18.5 $ft^2$ based on standard blade designs. In contrast a turbine with 30 blades of similar design with the same diameter has about 304 $ft^2$ of working blade area.

Figure 10:
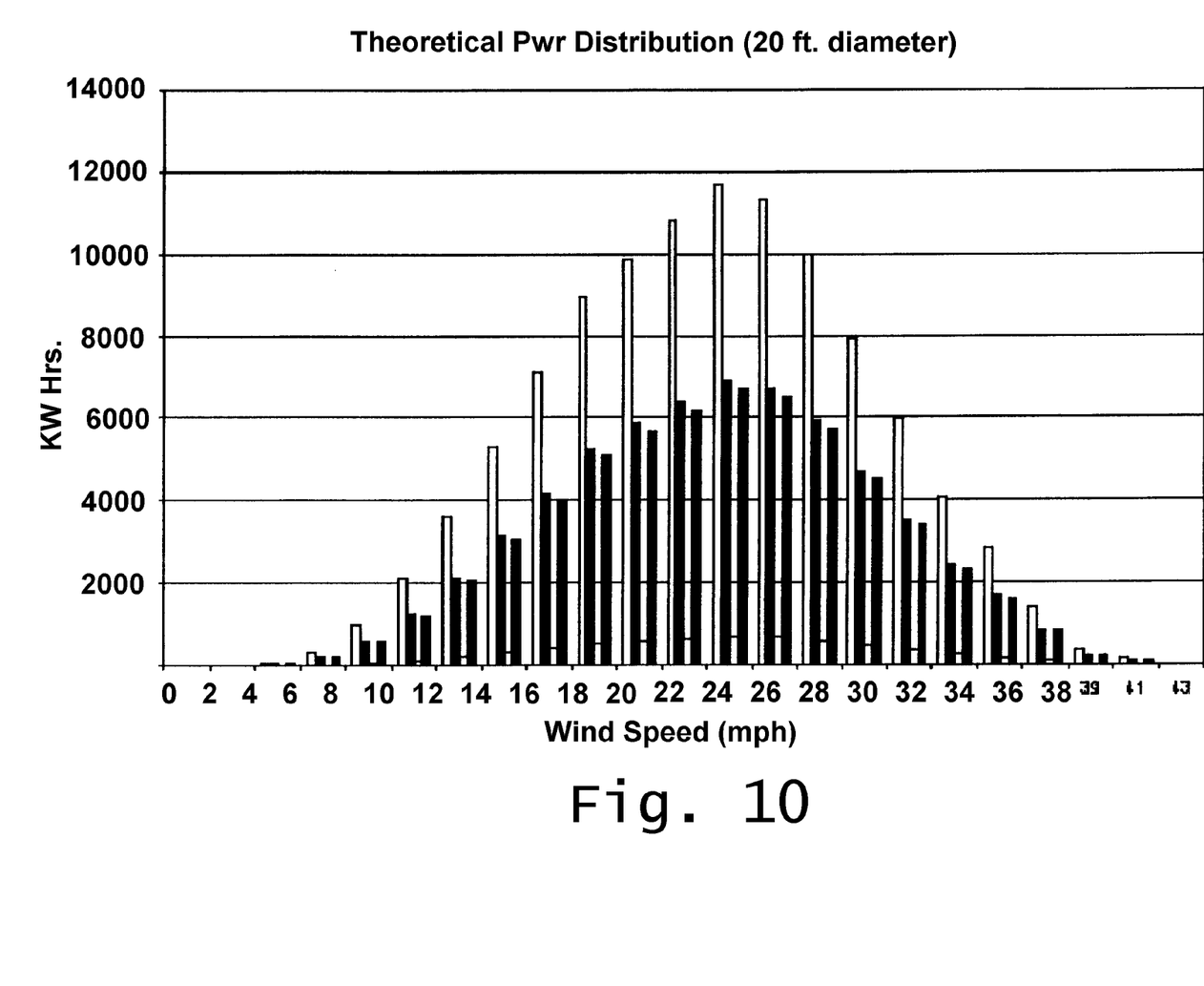
FIG. 10 is a chart compares theoretical power, available practical power and approximate power production for turbines having 3 blades with those having 30 blade designs.

In accordance with Betz's Law, the amount of practical power output for a 20-foot diameter, 3 bladed design is about 4.381 Kwatt-hours, while a 30 bladed design will theoretically produce 45,234 Kwatt-hours. The chart shown in FIG. 10 compares the annual power produced at the same wind speeds discussed and compares theoretical power, available practical power (Betz's Law) and approximate power production for turbines having 3 blades and those having 30 blade designs.

In this figure a comparison is made between 3 and 30-blade designs in which the surface area per blade is the same. The diagram demonstrates that the 30-blade rotor produces substantially more power than the 3 blade design.

In this diagram, the data is grouped into sets of four bars per set. The first, or left-most bar of each set represents the same data from FIG. 10, which represent the available energy in the wind in a 20 ft diameter space off the coast of Northeastern United States. The second bar of each set, to the right of the first bar, represents the impact of Betz's Law on the available wind or what can be practically extracted from the wind by a perfect wind turbine. The third bar of each set, to the right of the second bar, represents the wind energy transformed into mechanical energy with a 3-bladed design. Finally, the fourth bar of each set, to the right of the third bar, represents the wind energy transformed into mechanical energy with a 30-bladed design.

As an alternative manner of viewing this figure, the white bars represent the theoretical power available, the tallest black bars the results of Betz's law, the shorter black bars the calculated effect of a 30 blade turbine or turbine utilizing the maximum available rotor surface area and the short white bars represent the calculated effect of a three bladed turbine of the same diameter and same blade size as the 30 blade example.

These diagrams show that 30 blade turbines provide a much greater opportunity for converting most available wind energy to mechanical energy, based on their greater surface area exposed to the wind. Utilizing more surface area to capture the wind sharply increases annual energy conversion.

Blade Construction:

In the present invention the wind turbine contains a number of blades, each in close proximity to the adjacent blades. The design is depicted in FIG. 3. The collection vessel is viewed head on, with the bow 4 in view. The wind turbine 6 is seen to contain a large number of blades 7, packed tightly together. Whereas standard turbine blades are long and thin, the blades of the present invention are equally long, but are wider than standard turbine blades. As a result, the force on each turbine blade is less than that of the standard turbine for the same power produced, since each blade takes a proportionally smaller force.

As a result, each of the blades can be made of lighter, thinner material than in the standard wind turbine.

Furthermore the blades of the present invention do not travel as fast as prior art blades; therefore, there is a lower dependency on high efficiency aerodynamics. The present blades do not present a perfectly aerodynamic airfoil design.

The present blades are of a much lighter construction than prior art blades. Support wires, or stays are used in the blades of the present invention to provide strength and reduce the cost of construction normally associated with manufacturing high tech/high efficiency/high strength composite blades. Traditional strut and covering construction will be used in this invention to allow for lightweight, high-strength and low cost blades.

Figure 4:
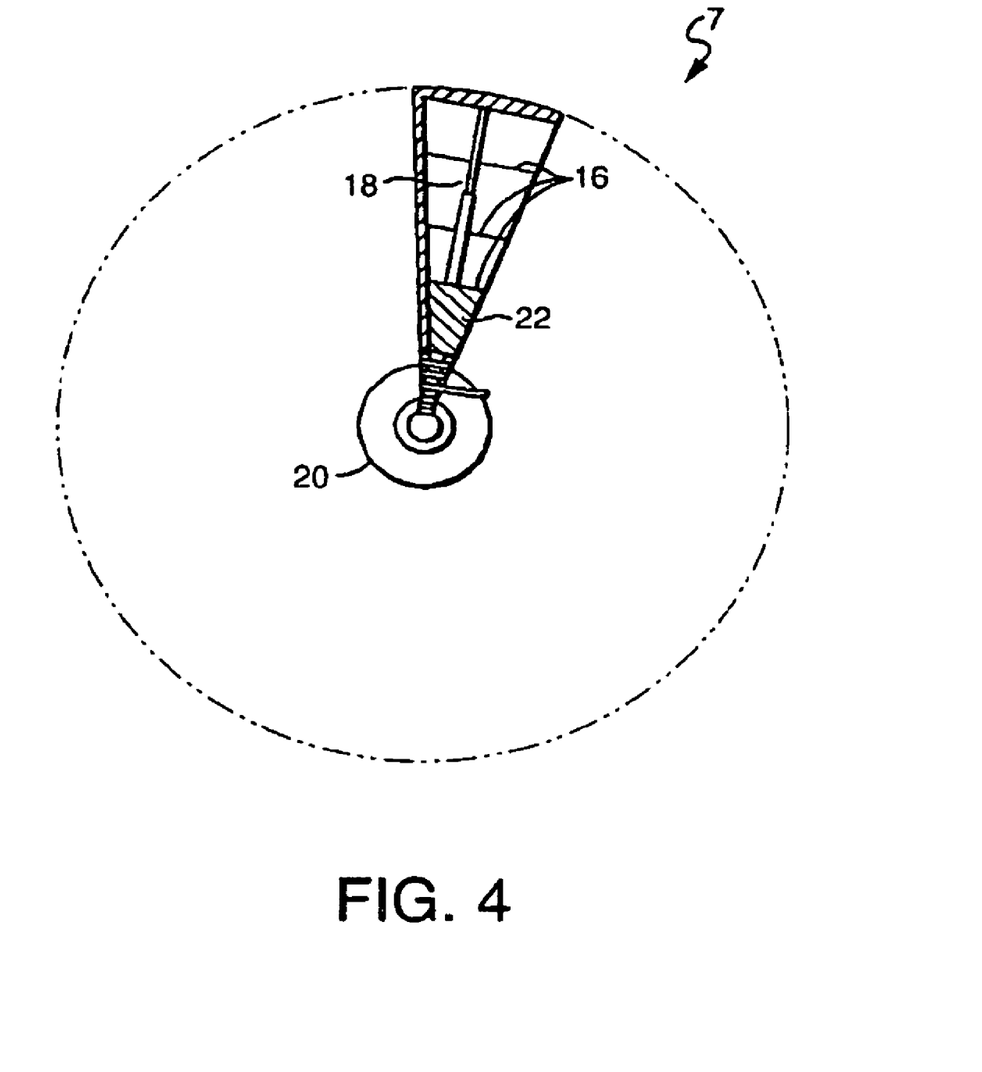
FIG. 4 depicts a front elevation view of a wind turbine, with only a single blade shown in detail.

Such a configuration is shown in FIG. 4. A single blade 7 is depicted, although in practice the turbine will contain a multiplicity of these, as seen in FIG. 3. Still referring to FIG. 4, the blade is affixed at its center to an armature 20, which rotates and causes the blades to rotate with it. The blade contains a central beam 18 lengthwise through the center of the blade. It is covered by a foil 20, which is shown only extending between the hub and the strut nearest to the hub, but which, in actuality extends over the entire surface of the blade.

The preferred embodiment uses a 30-blade rotor. In other embodiments different numbers of blades per rotor may be chosen, in order to maximize available total rotor surface area within a given rotor diameter.

Figure 2:
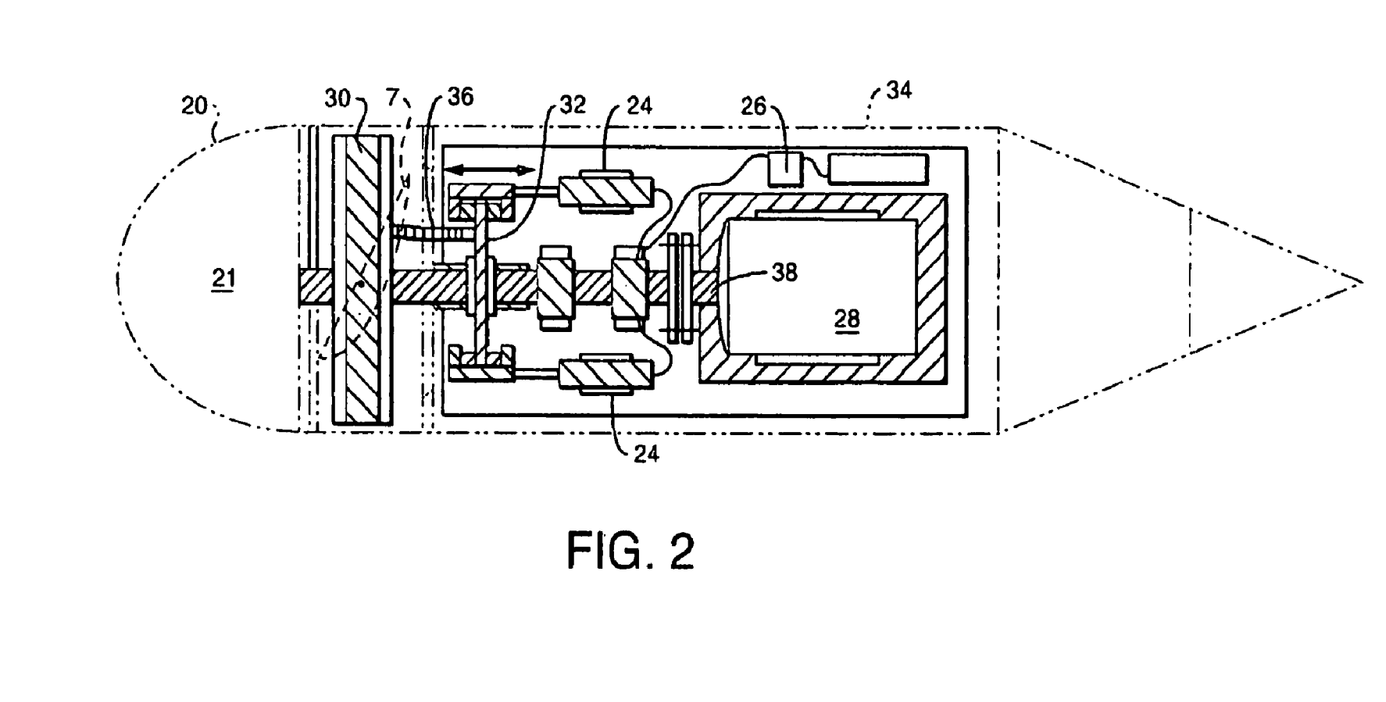
FIG. 2 depicts a cross section of the wind turbine armature.

Adjusting the angle of attack of the rotor blades is effected by a hydraulic system. Referring next to FIG. 2, a cross-section view of the armature on the wind turbine is shown. A primary disc 30 is caused to rotate by the wind, the blades 7 rotatingly attached to the primary disk, so that the angle of attack can be altered. A central shaft 38 communicates between the mechanical elements in the armature 20, and the control module 34 located in proximity to the armature. When this central shaft rotates, the secondary disk 32, and the main generator 28 are made to rotate at the same rotational speed. Hydraulic cylinders 24 cause the rotating secondary disk to slide to the left as shown in the diagram, thus moving the activation arm, which controls the angle of attack of the blades 7. Control of this mechanism is done by a computerized control system, taking into account the actual and apparent wind speed and directions, in order both to maximize efficiency of generation of electricity, and to protect the wind turbine blades in high winds.

Hydrogen & Oxygen Generation:

The science of electrolysis has been known for over one hundred years. In the present invention the electricity generated by the generator is used as a source of power for electrolysis, which produces hydrogen and oxygen.

When a DC voltage is applied across a cathode and anode immersed in salt solution, positive and negative ions collect on the electrodes. A typical salt used is KOH (Potassium Hydroxide), which provides the ions to create a conductive path. Water will then be split into its elements. Hydrogen will form on the negative electrode and oxygen will form on the positive one. The gasses will continue to form until sufficient quantities cause them to rise through the water and collect as gas bubbles at the water surface.

Figure 5:
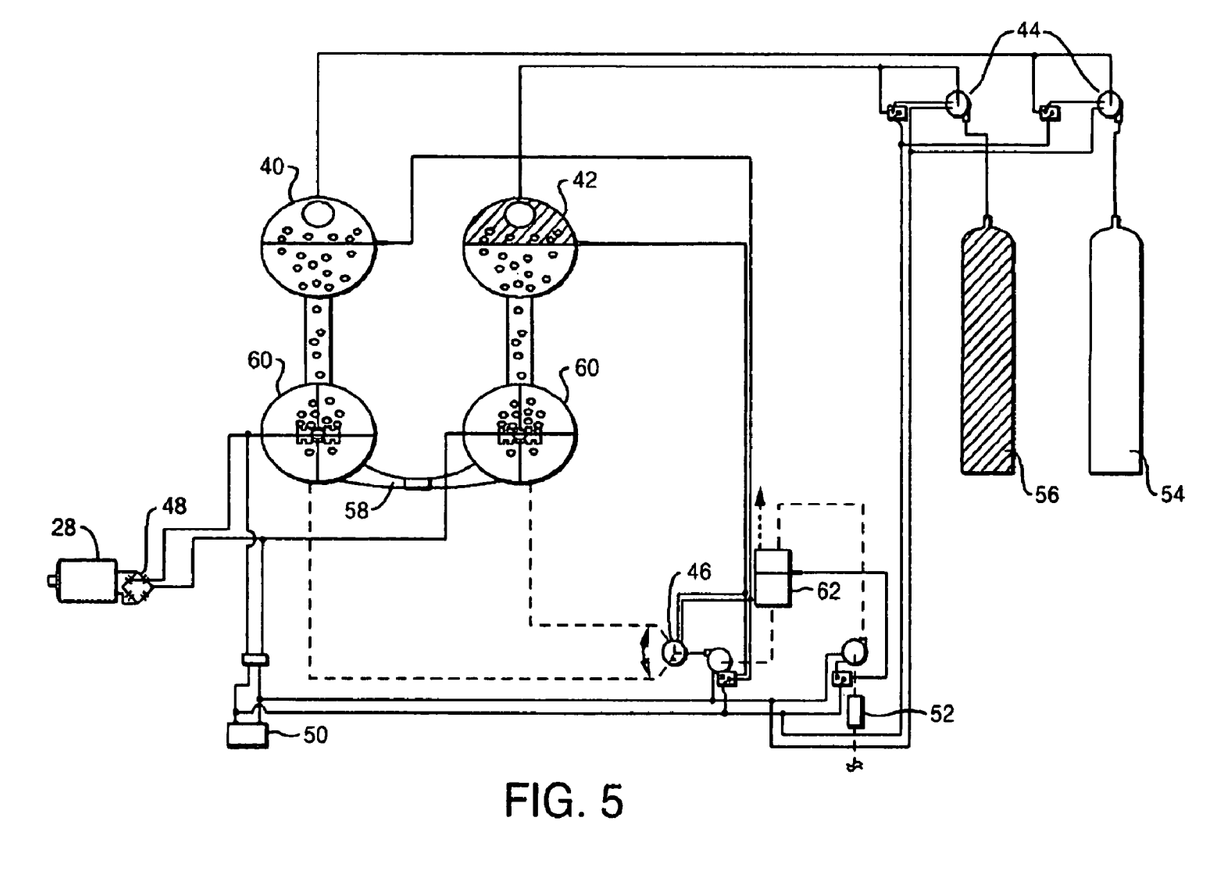
FIG. 5 depicts a hydrogen-oxygen-generator.

Referring now to FIG. 5, the electrolysis system is shown in cross-sectional view. The hydrogen reactor 40 and oxygen reactor 42 are filled with a salt solution of KOH. Each contains a carbon electrode 60 immersed in the solution. A bridge 58 connects the solution from the two reactors, allowing the migration of ions between the electrodes. The hydrogen gas collected at the hydrogen reactor 40 is pumped into the hydrogen cylinder 54 by means of a compressor, separately from the oxygen, which is pumped into the oxygen cylinder 56 by means of a separate compressor. Care needs to be taken to collect the oxygen and hydrogen separately since they will recombine to form water if allowed to do so, with a danger of explosion.

The rate of generation of the gasses is directly proportional to the amount of power applied, which is the product of the voltage across the electrodes and the current passing through the electrodes and through the solution.

The electrolysis system of the present invention is constructed from materials that will minimize the corrosion, which can occur. The electrodes are constructed from carbon, which will not break down during electrolysis.

Purified water is used as the starting point for the salt solution, and is first stored in the purified water reservoir 62. It is pumped into the reservoir through a small micron filter 52 intended to remove any organic impurities. Providing a 1 to 2 micron filter in this manner will minimize the number and size of organic chemicals in the system. For the purposes of generating commercial hydrogen and oxygen, an impurity level less than 0.5% would produce oxygen and hydrogen of sufficient purity for industrial purposes. If needed, however, additional industry standard purification processes can be used as needed to further refine the gasses at a shore based facility.

The presence of organic material in the solution would mix with the salt solution, and could cause additional gasses to be emitted together with the Hydrogen and Oxygen. Nitrogen gas, for instance, is one of the contaminants that result from organic chemicals in the water.

After filtering the purified water, KOH is added. The solution is then in condition for the electrolysis process to begin.

Electrical power is supplied to the solution by the generator 28, which, in the preferred embodiment, is a single-phase synchronous generator. A back-up battery 50 is provided for starting the generator after periodic idle periods due to a lack of wind. The battery is charged during times of energy production by the generator. AC power is converted into DC by a full bridge rectifier 48, which is connected to the carbon electrodes 60 immersed in the KOH solution as discussed above.

Gasses are pumped away at approximately the rate that they are produced. Since there are two hydrogen atoms for each oxygen atom in water, twice as much hydrogen will be produced as oxygen. Sensors in the system will sense gas and solution levels in the system and control valves and pumps to maintain levels as required.

Figure 6:
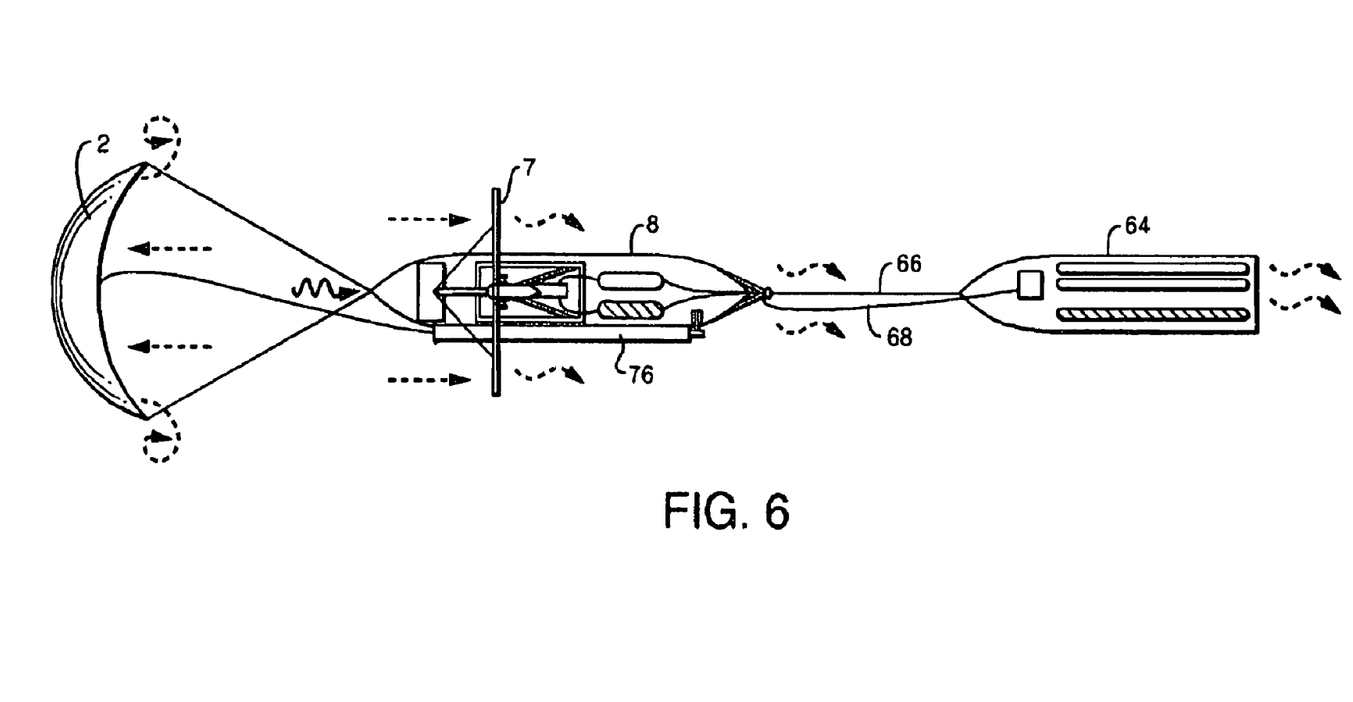
FIG. 6 depicts a top plan view of a collection vessel in collection mode attached to a storage vessel.

Transfer and Distribution:

Referring now to FIG. 6, there are two vessels involved with retrieving, compressing and storing product gasses. The collection vessel 8 has a small storage capability in which the hydrogen and oxygen cylinders are stored, sufficient to power the propulsion system of the collection vessel as required for maneuvering. The storage vessel 64, is affixed to the collection vessel by towlines 66.

Once the onboard storage containers in the collection vessel are filled to capacity, a sensor will detect the pressure and trigger an onboard booster pump on the storage vessel to start pumping. The line connecting the two vessels has a dual purpose. Besides securing the two vessels together, they support gas transfer from the collection vessel to the storage vessel, and further support transfer of purified water lines between the vessels, to allow refreshing of the solution in the electrolysis chambers.

The booster pump will pump down the smaller containers on the collection vessel until they fall below a lower pressure value, at which point the pump will shut off. When the pressure begins to build back up due to new gas production on the collection vessel, and exceeds a high pressure value the pumping will start up again.

Once pressure levels in the storage vessel reach a maximum storage control value, a sensor will trigger a radio message to a shore-based control center to send a second storage vessel to the site of the now-full storage vessel. When it reaches the site a final message will be sent to the control center to stop transferring the gasses and to then detach the storage vessel from the collection vessel. The second storage vessel is then remotely navigated to the collection vessel where the two are docked. The collection and storage cycles are then re-initiated.

The newly arriving storage vessel, which is self-propelled, will supply purified water to the collection vessel, which is then used to refresh the salt solution used for electrolysis.

In order to facilitate the transfers of gasses at sea as just described, the vessels will have remote docking capability, similar to air-to-air refueling systems currently being practiced by the armed forces.

Figure 9:
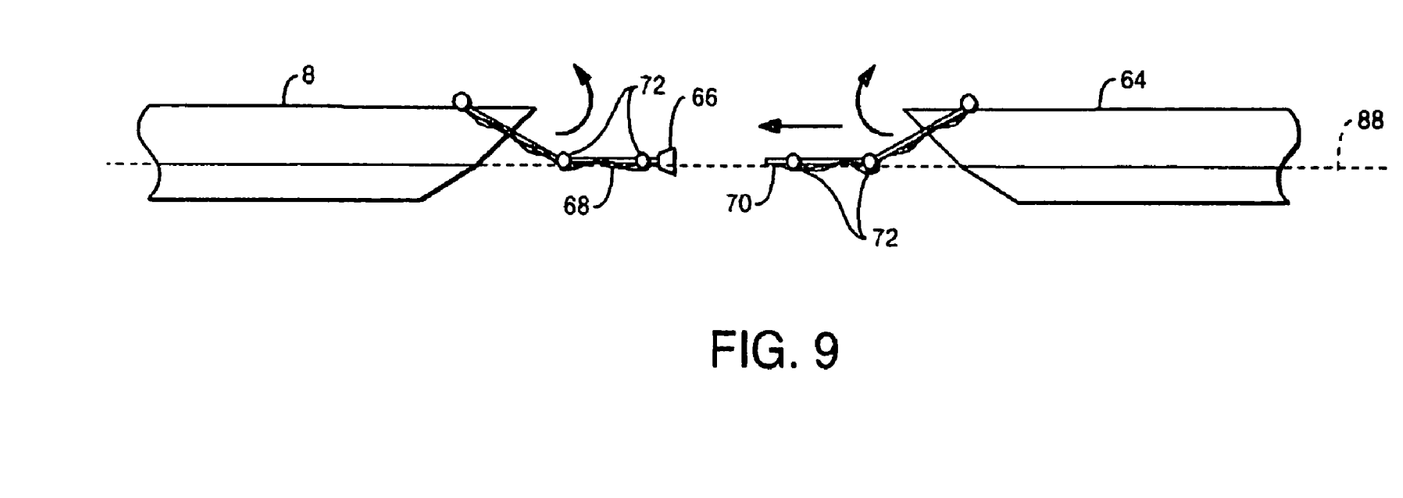
FIG. 9 depicts a side elevation view of the bows of two vessels beginning a docking operation.

The system of the current invention would utilize a similar technology. Referring now to FIG. 9, a collection vessel 8 and a storage vessel 64 are approaching each other. The female end 66 of the transfer line is floating in the water, connected by hydrogen, oxygen and water feed lines to a securing cable 68, while the male end 70, connected to the storage vessel is lying in proximity. The male & female ends are rigid so they cannot rotate laterally but they can pivot vertically, so that they will effectively ride atop the waves. Flotation buoys 72 keep the transfer line afloat. Through the use of inexpensive sensors and computer controls the docking maneuver is automated so that a minimum of human intervention is involved.

In a further embodiment the docking maneuver is totally automated, once the vessels are maneuvered to a predetermined distance from each other.

In one of the preferred embodiments a central discharge station is used as an intermediate storage location. It is located on the water, but where the depth of the water is sufficiently small so that a pipeline can be conveniently laid, to relay the stored gasses to a shore storage station.

Docking to the central discharge station would even be performed in a similar manner to the docking between vessels at sea. Automated docking is the preferred method, but manual override is available as a back up option should the autonomous docking system experience problems.

The entire system is under the control of a shore-based central control center where all vessel movement and off-loading is controlled. All vessels will have the same navigational capability, which is monitored and remotely controlled from this location. This central control center is the only location requiring human, hands-on operation. All other activity in the system, with the exception of maintenance, is at the central control center through the use of remote controls and communications. As a result the potential safety risks of handling vessels at sea loaded with hydrogen is minimized.

Wind Turbine Vessel Drift

Figure 8A:
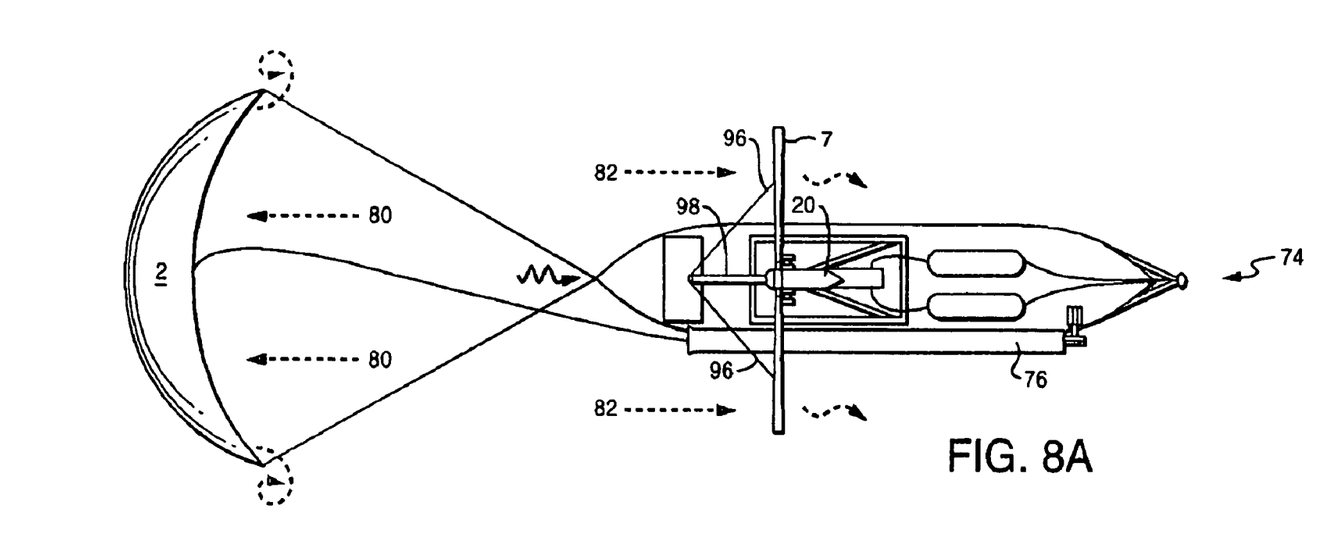
FIG. 8a depicts a top plan view of a collection vessel in collection mode, with wind turbine set up for operation.

The collection vessels and storage vessels, while not under power for navigating to a new zone or changing storage vessels, will drift in a controlled manner from the force of the wind. FIG. 8a shows a collection vessel in collection mode, with the sea anchor 2 deployed. The rate of drift will depend upon the speed of the wind, as well as any local tides. A sea anchor 2 also keeps the turbine facing the wind in order to maximize turbine efficiency. As previously stated the sea anchor further minimizes drift.

Repositioning of vessels drifting outside their predetermined zones is accomplished with the aid of GPS systems on-board the collection vessels that continuously monitor the vessel position, and relay this information back to the control center. If any of the vessels require repositioning their onboard propulsion systems are started in order to navigate to the new position.

Prior to retrieving the sea anchor the engines are firing up, the turbine blades are feathered and then retracted. The collection vessel is then maneuvered forward to relieve tension on the sea anchor and its lines so that it can then be retrieved. Once the sea anchor and turbine blades are secured, navigation to a new location can occur. Once the new position is achieved, the sea anchor is redeployed to continue converting wind energy to mechanical energy.

Referring now to FIG. 8a, it may be seen that when deployed the sea anchor 2 is forced taught by the force 80 of the water filling the anchor like a parachute while the collection vessel is pushed by the wind 82. The higher the wind the more the anchor will resist the force of the wind on the vessel. Furthermore, the sea anchor aligns the bow of the vessel directly into the wind.

The collection vessel continues to drift in this way until the vessel has drifted outside of the zone boundaries, and therefore needs repositioning. Before getting under way, the sea anchor must be retrieved otherwise the vessel may move into the sea anchor, fouling the vessel, and damaging or destroying the sea anchor.

Figure 8B:
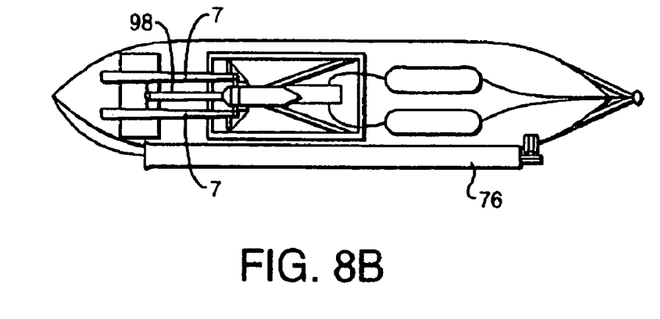
FIG. 8b depicts a top plan view of the collection vessel in navigation mode, with the wind turbine set up for navigation.

Referring now to FIG. 8b the collection vehicle has been reconfigured so that it may safely navigate to a new position. The blades 7 have been retracted into a position facing the bow of the collection vehicle and the sea anchor 2 has been stored in the sea anchor storage compartment 76.

Figure 7:
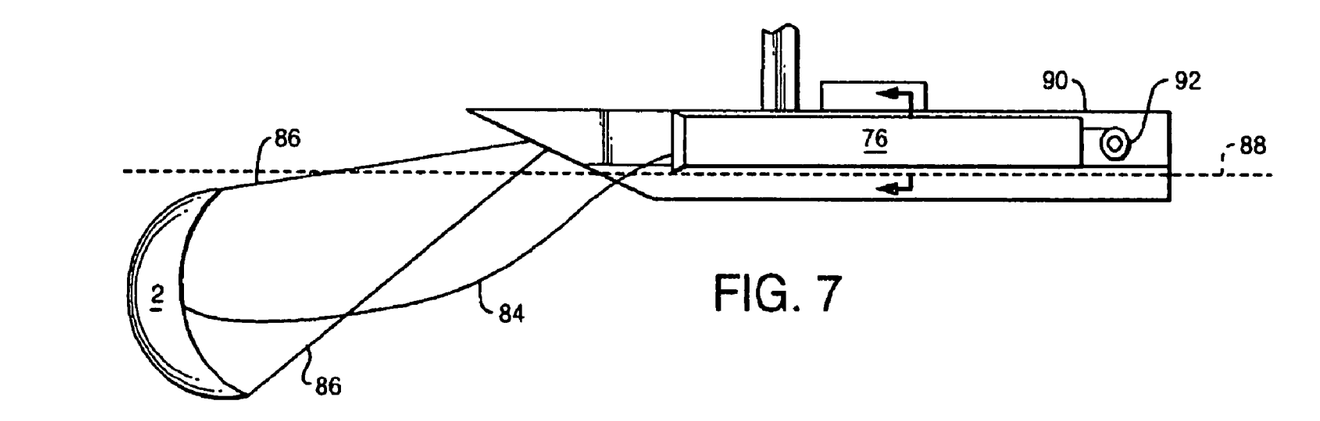
FIG. 7 depicts a collection vessel with sea anchor, cables, and sea anchor storage tube shown.
Figure 7A:
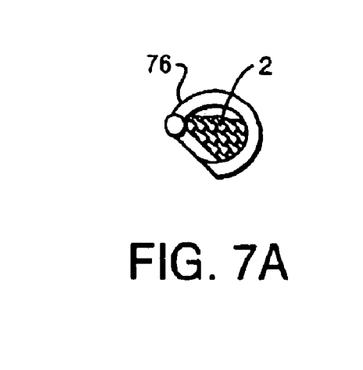
FIG. 7a depicts a cross section view of the storage tube, closed, with sea anchor within.

Referring next to FIG. 7a retraction of the sea anchor is accomplished by means of a retraction cable 84 connected to the center of the sea anchor 2. The retraction cable is limp as shown in FIG. 7a when the sea anchor is deployed and under tension when retracting the sea anchor.

To retract, the vessel would move forward slightly using its onboard propulsion system and begin to draw the retraction cable into the storage tube 76, which is secured on the vessel, by means of an onboard retraction winch 92 which are powered by the rechargeable batteries. As the retraction cable 84 becomes taught, drawing the center of the sea anchor toward the vessel, and the sea anchor disposal cables 86 become slack. The sea anchor collapses as the "parachute" shape is destroyed, and its drag on the collection vessel is drastically reduced, allowing the sea anchor to be winched in.

The winch 92 which draws in the retraction cable 86 is located on the back-end 90 of the storage tube and draws the retraction cable through the storage tube 76, located along the length of the vessel hull. A cross-section of the storage tube is shown in FIG. 7a, with the sea anchor 2 stored within.

Figure 7B:
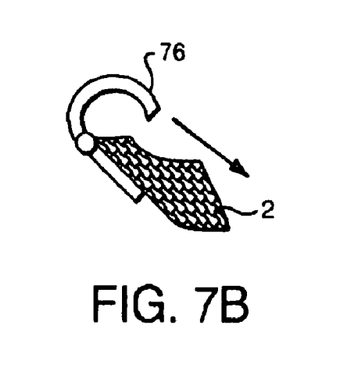
FIG. 7b depicts a cross section view of the storage tube, open, with the sea anchor beginning to descend.
Figure 7C:
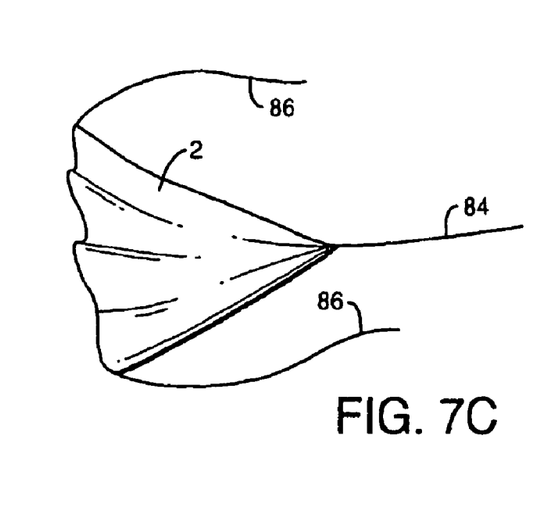
FIG. 7c depicts a side elevation view of the sea anchor being retracted.

When the new desired position is achieved, the collection vessel pulls into the wind and the sea anchor is redeployed. The storage tube is hinged along one side, as shown in the cross-sectional view of FIG. 7b, so that the tube opens along its entire length, allowing the sea anchor to fall into the water below when the tube opens. Backing the vessel further assists the deployment of the sea anchor.

Once deployment is complete, the turbine blades are rotated into position and the on-board engines are shut down.

Wind Turbine Retraction:

The ability of the wind turbine blades to retract for the purposes of vessel transport and vessel protection during high windstorms is a truly unique feature for wind turbine designs.

In standard wind turbines the blades are subject to high shear forces, requiring thick bases and heavy composite construction to withstand high torques at the base of the turbine blades where they meet the armatures. In the present design, in contrast, the blades are subject to forces which act largely in compression so that torques at the armature are minimized.

Because of the diminution of forces in the present design a much lighter-weight construction is possible. Referring again to FIG. 8a, wire stays 96, or guy wires, support the turbine blades, which can be of lighter construction as a result of the support of the stays, which are secured at one or more points along the length of the blades at one end, with the other end secured to the center of the armature extension. The extension protrudes from the center of the armature nose 21 and is approximately equal in length to two-thirds the length of a blade. Each blade is supported in this manner resulting in multiple cables converging at the armature nose extension end.

When the collection vessel is under power the turbine blades must be first stowed, as shown in FIG. 8b. As seen in this figure, the stays have been retracted in the armature nose extension, thereby keeping the blades from opening. The blade bases are hinged where they meet the armature, and the blades themselves must be rotated to a completely feathered position prior to retracting. With a high number of turbine blades in close proximity, as shown in FIG. 3, feathering is essential before retraction so that the blades do not physically interfere with each other when retracted.

While the invention has been described with reference to specific embodiments, it will be apparent that improvements and modifications may be made within the purview of the invention without departing from the scope of the invention defined in the appended claims.

What is claimed is:

1. A method for generation of gasses contained in a salt solution by the steps of:
   (a) disposing one or more floating wind turbines on waters distant from a proximate shore, wherein said floating wind turbines further comprise wind turbines affixed to navigable collection vessels at sea;
   (b) disposing said vessels with one or more predetermined geographic zones, each of said zones having a suitable wind velocity for operation of said wind turbines, being without established shipping lanes, and providing communication between the collection vessels within the zone and a command center;

(c) generating electricity by an electrical generator connected to each of the wind turbines; and (d) extracting said gasses from a salt solution by means of electrolysis using said electricity.

2. The method of claim 1, wherein each wind turbine further comprises a multiplicity of blades having a controllable angle of attack, the method further comprising adjusting the angle of attack to optimize power output.

3. The method of claim 2, further comprising controlling said vessels by remote control.

4. The method of claim 3, further retracting the blades of said turbines during collection vessel travel, and in area of high wind, so that the wind turbines are not damaged thereby.

5. The method of claim 4, further comprising the step of locating one or more storage vessels within each predetermined zone for periodic transport of said gasses.

6. The method of claim 5, further comprising the steps of:
(a) locating a sea based central transfer station for collecting said gasses; and
(b) pipelining of the gasses from the sea based central transfer station into a shore storage and purification facility.

7. The method of claim 6, further comprising providing means for the remote-controlled docking of any two or more of said collection vessels at sea for transferring said gasses between said collection vessels.

8. The method of claim 7, further comprising disposing of a sea anchor by one or more of the collection vessels to reduce the drift of the vessel and to maintain the vessel with its bow facing into the wind.

9. The method of claim 8, further comprising:
(a) providing a multiplicity of cables for maintaining the sea anchor in an anchoring position, and one or more retraction cables for retracting the sea anchor;
retracting the sea anchor into a storage tube; and
extracting the sea anchor from the storage tube into disposed mode.

10. The method of claim 9, further comprising, for each current wind speed and generator load, maximizing the torque from each electrical generator by the steps of:
(a) increasing the number of blades in the turbine to an optimum number;
(b) increasing the area of each such blade to an optimum area;
(c) autonomously controlling each turbine blade angle to the optimum blade angle.

11. The steps of any of claims 2 through 7, alternatively, wherein the gasses so produced are oxygen and hydrogen.

* * * * *